(No Model.)
J. W. ANTHOINE.
COTTON SEED AND GRAIN CRUSHER.
No. 328,996. Patented Oct. 27, 1885.
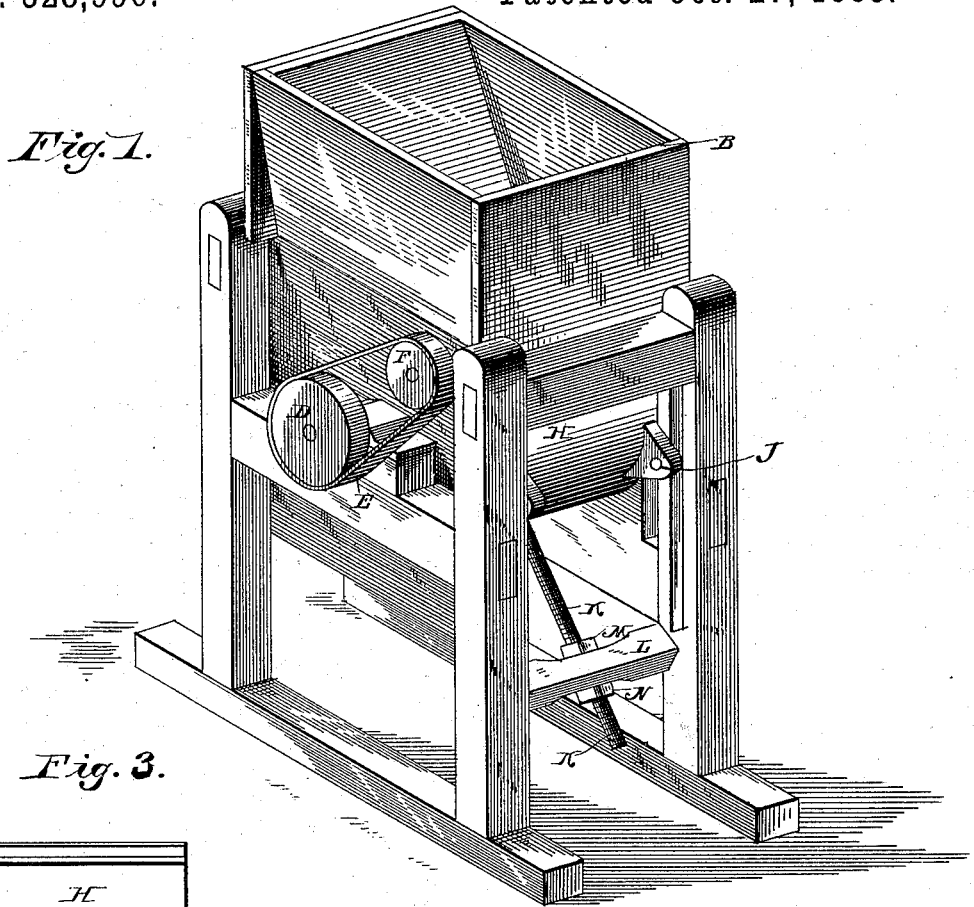
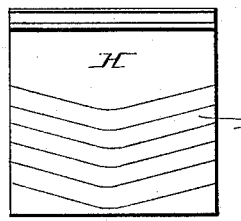
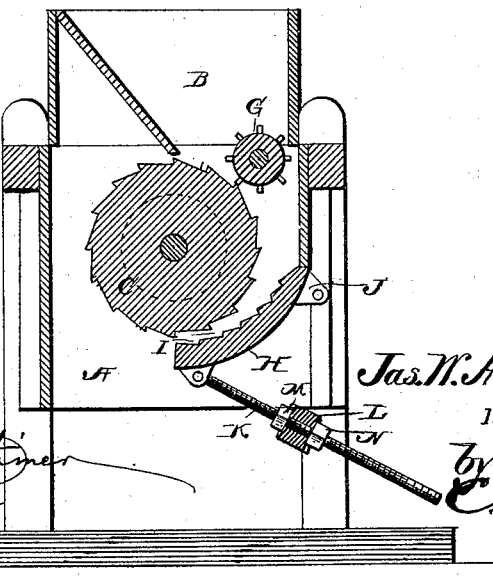
WITNESSES
Jas. W. Anthoine
INVENTOR

UNITED STATES PATENT OFFICE.

JAMES W. ANTHOINE, OF EUFAULA, ALABAMA.

COTTON-SEED AND GRAIN CRUSHER.

SPECIFICATION forming part of Letters Patent No. 328,996, dated October 27, 1885.

Application filed November 24, 1884. Serial No. 148,717. (No model.)

*To all whom it may concern:*

Be it known that I, JAMES W. ANTHOINE, a citizen of the United States, residing at Eufaula, in the county of Barbour and State of Alabama, have invented new and useful Improvements in Cotton-Seed and Grain Crushers, of which the following is a specification, reference being had to the accompanying drawings.

This invention relates to that class of grinding-mills known as "cylinder and concave," and has for its objects to provide a novel formation of the concave grinding-surface, by which the stock or grain will be directed from the edges toward the center of the said concave grinding-surface; and also a simple, conveniently-operated and efficient mechanism by which to adjust the concave to and from the cylinder and hold it firmly at any desired point of adjustment.

To these ends the invention consists in certain novel features of construction, which will be hereinafter first fully described, and then pointed out in the claims.

In the drawings, Figure 1 is a perspective, and Fig. 2 a vertical longitudinal section, of a machine constructed according to my invention, and Fig. 3 is a face view of the concave.

The box or casing A is mounted on a suitable supporting-frame, and has a hopper, B, in its upper end. The cylinder C is located within the casing and below the hopper. I form this cylinder with teeth or flutes extended longitudinally from end to end, which teeth break and crush the seeds against the concave, presently described. The shaft of cylinder C is extended through the casing and suitably journaled in the supporting-frame, in order to relieve the casing of the strain of the cylinder. On one end of this shaft I secure a band-pulley, D, which is geared by a belt, E, with a pulley, F, secured to the shaft of the feed-roller G. The feed-roller G has bearings in the casing above the cylinder C, and is provided with numerous teeth, which in operation serve to agitate and separate the seeds, grains, &c., as they pass to the grinding-surfaces, and prevent their reaching such surfaces in a massed or lumpy condition. The concave H is provided on its upper side or grinding-surface with teeth I, which are formed at an angle inclining downward from its opposite edges to its central line, at which point their inner ends join. By this construction the grain, seeds, &c., are directed to the center of the concave grinding-surface, and the major part of the grinding is done at such point. I thus avoid gumming of the meal against the side of the case close to the ends of the cylinder, which gumming tends to make the machine difficult to operate, and involves a frequent cleaning thereof, as will obviously appear. The upper end of the concave is pivotally supported at J, preferably by means of pins passed through ears projected from the opposite edges of the concave and into the supporting-frame, as shown. The adjusting-rod K is pivoted at one end to the lower end of the concave, and has its other end projected through a cross-beam, L. This rod K is threaded, and nuts M N are turned on it, respectively above and below the crossbeam L. By adjusting these nuts on the rod the concave may be set to and from the cylinder, so as to grind finely or not, as desired. It will be noticed that by nuts M N the concave may not only be set in any desired position, but may also be positively held in such position from movement toward as well as from the cylinder. By so holding the concave firmly to its place all jarring and jolting arising from an unequal feeding of the seed or grain is avoided. The cross-beam is preferably journaled at its ends, so it may partially revolve to permit the slight change of line of the rod K, incident to the latter's moving at one end in the arc described by the concave. I prefer to so journal the beam and to fit the rod K snugly in the opening therethrough, as thereby a firm support for the rod is provided.

While my mill is especially designed for the grinding of cotton and other fine seed, it is evident it may, when desired, be used for corn or other larger seed.

It will be observed that the spiked feed-roller G extends transversely across the open bottom of the hopper at one end thereof. The grinding-cylinder is located below the hopper, and as it revolves a portion of the circumference or periphery of the cylinder communicates with the open bottom of the hopper.

Thus the feed-roller and grinding-cylinder close up the open bottom, so that none of the seed can escape without being acted upon. The point at which the cylinder and feed-roller meet is on a line with the inclined side of the hopper, and thus as the seed is fed downward it will be caught between the cylinder and roller and acted upon. The spiked roller will serve to clear the teeth or flutes of the grinding-cylinder from accumulations of matter, so as to prevent clogging. It will be seen that a space is left between the casing and the cylinder, which space provides a chute for the downward escape of the seed after being acted upon between the feed-roller and the cylinder, the seed being caught by the concave H and fed between the latter and the lower part of the cylinder.

It will be observed that the teeth on the concave and grinding cylinder extend in different directions to each other, this construction enabling the grinding to be more effective. The grinding-surface H not only holds the seed for action by the grinding-cylinder, but assists in grinding it.

Having thus described my invention, what I claim and desire to secure by Letters Patent, is—

1. The combination, with the box or casing, hopper, and grinding or crushing cylinder, of the concave grinding-surface H, provided with ears at its upper end, pins passing through the ears into the casing, an adjusting-rod, K, arranged in an inclined line and pivoted at one end in ears projecting from the grinding-surface, a cross-beam, L, journaled at its ends in the casing and adapted to be partially revolved, and provided with an opening for the passage of said rod, and nuts working on the rod on either side of the beam, so as to bind against the latter, as set forth.

2. The grinding-cylinder having teeth or flutes extending along its periphery or face, which teeth are arranged parallel with the axis of the cylinder, in combination with the concave segmental grinding-surface H, provided with teeth arranged at an angle and inclining inwardly and downwardly from its opposite edges toward its center, the abrupt sides of the teeth of the cylinder extending in an opposite direction from those on the concave, and devices for adjusting the concave relative to the cylinder, as set forth.

3. The box or casing A and the hopper B, in combination with the spiked feed-roller G, arranged transversely across the open bottom of the hopper at one end, the grinding-cylinder C, having longitudinal flutes or teeth, and located below the hopper, a portion of the circumference of the cylinder communicating with the open bottom of the hopper, so that the feed-roller and grinding-cylinder close up the bottom, a space being left between the side of the casing and the cylinder to provide a chute for the escape of the seed down after being acted upon between the feed-roller and cylinder, and the concave grinding-surface H, arranged at one side of the casing around the lower portion of the cylinder, and having teeth on its inner face, said concave surface H catching the seed as it descends and holding it for action by the grinding-cylinder, and also assisting in grinding it, as set forth.

In testimony that I claim the foregoing as my own I have hereto affixed my signature in presence of two witnesses.

JAMES W. ANTHOINE.

Witnesses:
  E. B. YOUNG,
  E. Y. DENT.